Feb. 16, 1926.
W. A. McCOOL
1,573,078
CONFECTION AND METHOD OF MAKING THE SAME
Filed June 11, 1924
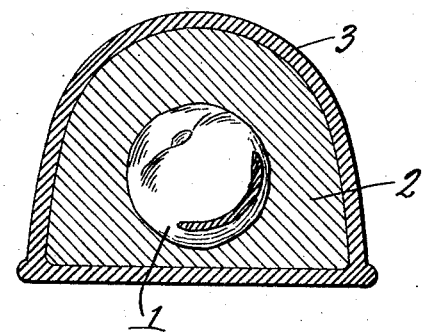
W. A. McCool
Inventor
By C A Snow & Co.
Attorneys Patented Feb. 16, 1926.

1,573,078

UNITED STATES PATENT OFFICE.

WILLIAM A. McCOOL, OF TRAVERSE CITY, MICHIGAN.

CONFECTION AND METHOD OF MAKING THE SAME.

Application filed June 11, 1924. Serial No. 719,387.

*To all whom it may concern:*

Be it known that I, WILLIAM A. McCOOL, a citizen of the United States, residing at Traverse City, in the county of Grand Traverse and State of Michigan, have invented a new and useful Confection and Method of Making the Same, of which the following is a specification.

This invention relates to a confection and to a method of making the same, the principal object being to provide a means whereby sour red cherries such as cultivated in abundance in many parts of the United States can be utilized as centers for candies. As far as I am aware, the only cherries heretofore used as centers for candies have been specially treated fruits known as "maraschino" cherries. These cherries have generally been treated with coloring matter, preservatives, etc., and it is usually necessary to display in connection with confections containing the same, the objectionable notice "Imitation". The pure natural fruit of the red sour type has not been successfully used because the acid contained in the fruit has quickly broken down the edible coating and rendered the confection unsuitable for handling.

Canned sour red cherries have long been used in the manufacture of various foods and delicacies but heretofore the candy field has not been available for such use because of the objection heretofore mentioned.

It is an object of the present invention to so treat cherries of the kind mentioned that they can be used satisfactorily as centers for candies without necessitating the use of artificial coloring matter or of any ingredients that would require designation of the fruit as "imitation" which notice, obviously, is decidedly objectionable in the candy industry.

With the foregoing and other objects in view the invention consists of certain steps in the method hereinafter pointed out and certain combinations of parts which will be hereinafter more fully described and pointed out in the claims. In the accompanying drawing is shown a section through a confection made in accordance with the present invention.

In carrying out the method the sour red cherries are first pitted, after which they are placed in a container with cane or other suitable sugar so that the juice of the cherries will mix with the sugar and form a red syrup. To the bulk of this mixture of cherries and sugar is added a preservative which can be one-tenth of 1% by bulk of benzoate of soda. To this same mixture is also added an ingredient designed to neutralize the acid contained in the fruit. Neutralization can be effected by various hydroxides or bicarbonates among which may be mentioned lime water, milk of magnesia, sodium hydroxide, potassium hydroxide, ammonium hydroxide, sodium bicarbonate and calcium bicarbonate. The amount of neutralizing agent placed in the container with the cherries and syrup can vary depending upon the approximate strength of the malic acid. It might be stated, however, that a sufficient amount of neutralizing agent can be added to properly react upon all of the acid in the mixture.

After these ingredients have been combined as stated, the product can, if desired, be chilled and placed in cold storage although it is not always essential if the preservative is used. The cherries with the syrup produced as above explained, are packed in suitable containers and then ready for shipment. By chilling the cherries the same are hardened and it is thus possible to handle them more readily than should they be left at normal temperatures.

In using the product the syrup is drained from the cherries after which each cherry can be coated with fondant (a creamy candy preparation) of any kind and this fondant is then provided with a hard non-porous edible coating of glazed candy, a good grade of chocolate, or any other suitable preparation.

The syrup with which the enclosed cherry is saturated will soften the fondant and produce a thick syrup within the chocolate coating. Inasmuch as the fruit acid has been neutralized, it will not attack the edible coating and, consequently, the candies can be preserved indefinitely and a luscious product produced.

In the drawing, the cherry has been shown at 1, the fondant at 2 and the edible coating (chocolate) at 3.

What is claimed is:—

1. The herein described method of producing candies with sour red cherry centers, which consists in mixing pitted fresh cherries with sugar to form a syrup which saturates the cherries, neutralizing the acid in the cherries, hardening the cherries by chilling them providing each hardened cherry with an inner coating of fondant to be converted into syrup by the fluid contents of the cherry, and providing an outer coating upon the fondant of hard non-porous edible material.

2. The herein described method of producing candies having centers of natural sour red cherries which includes placing fresh pitted cherries in sugar to produce a syrup, treating the cherries and syrup with an agent for neutralizing the fruit acid, providing each cherry with a coating of fondant, and providing each fondant coating with an outer coating of hard non-porous edible material.

In testimony that I claim the foregoing as my own, I have hereto affixed my signature.

WILLIAM A. McCOOL.